United States Patent [19]
Arnaud et al.

[11] Patent Number: 5,615,174
[45] Date of Patent: Mar. 25, 1997

[54] METHOD AND DEVICE FOR DETECTING OBJECTS DISPERSED IN AN AREA OF LAND BY DETERMINING PROPAGATION CHARACTERISTICS OF AN ACOUSTIC WAVE IN THE GROUND

[75] Inventors: Philippe Arnaud, Orleans; Loic Laine, Saint Doulchard, both of France

[73] Assignee: Giat Industries, Versailles Cedex, France

[21] Appl. No.: 567,054

[22] Filed: Dec. 4, 1995

[30] Foreign Application Priority Data

Dec. 20, 1994 [FR] France .................. 94 15338

[51] Int. Cl.$^6$ ........................ G01S 3/80
[52] U.S. Cl. ........................ 367/118
[58] Field of Search ............ 367/118, 119, 367/122, 124, 129, 14, 68; 89/1.13; 181/108, 111, 112

[56] References Cited

U.S. PATENT DOCUMENTS

| 5,337,289 | 8/1994 | Fasching et al. | 367/908 |
| 5,357,063 | 10/1994 | House et al. | 181/108 |

FOREIGN PATENT DOCUMENTS

| 2642640 | 8/1990 | France . |
| 2696573 | 4/1994 | France . |
| 2548041 | 4/1977 | Germany . |
| 4136587 | 5/1993 | Germany . |

Primary Examiner—Daniel T. Pihulic
Attorney, Agent, or Firm—Oliff & Berridge

[57] ABSTRACT

A process and a device for detecting objects, in particular mines, dispersed in an area of land, or for determining propagation characteristics of an acoustic wave in the ground of an area of land. This process employs a plurality of acoustic transducers and reference targets distributed along borders of the area. After determining an optimal working frequency, a cartography of the propagation characteristics in the ground of the area of land is made, for example, by carrying out several temporal reversals, one after the other, of the signals received by the transducers so as to focus detection on the different reference targets. Objects are detected with the aid of this cartography by focusing detection by temporal reversal on an object and by searching for at least two transducers which have the lowest propagation time for the signal.

13 Claims, 6 Drawing Sheets

METHOD AND DEVICE FOR DETECTING OBJECTS DISPERSED IN AN AREA OF LAND BY DETERMINING PROPAGATION CHARACTERISTICS OF AN ACOUSTIC WAVE IN THE GROUND

BACKGROUND OF THE INVENTION

The scope of the present invention is that of processes and devices allowing the detection of objects or the determination of the propagation characteristics of an acoustic wave in the ground of an area of land.

The invention is in particular aimed at a process and device enabling the detection of mines buried in an area of land.

Mine detecting processes and devices using magnetic means are known. These devices implement a generator and conductive coil. When a conductive material is in the vicinity of the coil, the current flowing through the latter is disturbed and a detection signal is supplied by an electronic processing circuit.

Such detection devices oblige the detection coil to be brought into the vicinity of the mine, thereby endangering the person responsible for handling the detector and thus making demining operations both long and difficult.

In addition, the detector risks being activated by magnetic objects other than the mines being searched for thereby causing false alarms which slow down the demining operations even more.

Lastly, such processes and devices are ill-adapted to the detection of modern mines which hardly use any magnetic materials.

A detection process and device are known elsewhere, notably by patent FR2696573, which are based on the principle of the temporal reversal of an acoustic wave.

This process implements a certain number of acoustic transducers (emitters/receivers) which enables an acoustic beam to be focused, practically automatically, on an object whose exact location is unknown.

The analysis of the signals picked up after a certain number of iterations enables a wave front to be determined wherein the crest or focal point indicates the location of the object.

Such a process is particularly well-adapted to medical imagery and enables the exact location of stones or tumors in the human body to be determined.

Indeed, in this case the transducers are placed at relatively small distances from the objects to be detected (less than 200 mm) and the propagation speed of the sound waves remains roughly the same in every direction of the area to be explored.

This process is, however, ill-adapted to the detection of objects in the ground and notably in land of a large surface area (in the region of 5 to 10,000 $m^2$).

In fact, the numerous heterogeneities present over such a surface area of land will vary the propagation speed of the sound waves in great proportions, making it impossible to determine a wave front which has a crest whose position is sufficiently well defined.

SUMMARY OF THE INVENTION

The aim of the present invention is to propose a detection process which does not present such disadvantages.

The process according to the invention thus enables the detection, using acoustic means, of objects (in particular mines) dispersed over an area of land. Therefore, it is not affected by the type of material, magnetic or not, which make up the objects.

The process according to the invention may be implemented at a distance from the objects to be detected thereby improving the safety of the operation when the objects in question are mines.

The process according to the invention enables objects to be detected in an area of land which is very large without having to go over the land with detection means, thereby improving safety even more.

The process according to the invention also allows, when being used for mine detection, the activation or destruction of the mines by remote control.

A device allowing such a process to be implemented forms a further subject of the invention.

This device ensures reliable and remote detection for large areas of land.

It is thus particularly well-adapted to clean-up operations of battle zones after combat.

A further aim of the invention is to propose a process enabling the determination of the propagation characteristics of an acoustic wave in the ground of an area of land.

Known processes envisage the use of acoustic emitters and receivers arranged in spaced-out points. They have the disadvantage of being complicated to implement, because of the distance separating emitters and receivers and the ensuing synchronization problems.

They are also relatively inaccurate because of the multiple reflections which may occur notably from obstacles buried in the ground.

The invention proposes a global approach both to the problems of determining the characteristics of the ground and to the problems of detecting buried objects.

The global concept of the invention proposed implements the principle of the temporal reversal of the acoustic waves which ensures, firstly the quick and accurate achievement of a cartography of the acoustic characteristics of the ground, and secondly the certain detection of buried objects, even in extensive areas of land.

The subject of the invention is thus a process to detect objects, and in particular mines dispersed in an area of land, a process characterized in that a multiplicity of transducers are implemented and in that the following stages are carried out:

n transducers are arranged along a first border of the area, m reference targets (m being more than 2) being distributed along a second border of the area;

an optimal operational frequency is determined for the transducers in accordance with the type of ground, a frequency which gives a received signal amplitude which is at its maximum for the majority of the transducers when emitted by one of them;

a cartography of the propagation characteristics in the ground of the area of land is made by determining a mean propagation speed $V_{ij}$ matrix along the different directions which connect each transducer $T_i$ (i varying from 1 to n) to each of the reference targets $C_j$ (j varying from 1 to m);

an initial pulse at the optimal frequency is sent into the ground by at least one transducer;

by means of at least one temporal window, the echo signals coming from a first object located in the area are selected;

k successive temporal reversals of the signals received by the transducers are made so as to focus detection of the first object and the signals reflected after the last temporal reversal are memorized;

two transducers Tx, Ty at least are located for which the propagation times of the signal tx, ty are the lowest;

the potential location points or zones for objects are determined for the transducers retained along several directions Dxj, Dyj which link the transducer Tx, Ty in question to a reference target Cj, the determination is made by computing the different distances dxj, dyj, (j varying from 1 to m) along directions Dxj, Dyj, the distance being equal to the product of the propagation time in question tx, ty by the appropriate coefficient Vxj, Vyj of the propagation speed matrix; and the actual location of the object is determined as the intersection zone of the different curves linking the potential location points associated with each transducer.

According to a first embodiment of the invention, to determine the mean propagation speed Vij matrix along the different directions which link each transducers Ti to each of the reference targets Cj, the following process is observed:

a brief and unfocused initial pulse is sent into the ground by at least one transducer at the optimal frequency;

the echo signals sent back by the ground and received by all the transducers are recorded, each return signal being memorized according to time, with the start time being the instant of sending the initial pulse;

by means of appropriate temporal windows, the echos signals coming from each reference target and successively selected and for each reference target several temporal reversals are carried out for the signals received by the transducers; and the mean propagation speeds Vij are computed as the quotient, for each transducer Ti, of its distance Dij from the reference target Cj on which the transducers are focused to the propagation time tij of the signal between this transducer and this target as it has been measured (i.e. Vij=Dij/tij).

According to a second embodiment of the invention, to determine the mean propagation speed Vij matrix along the different directions which link each transducer Ti to each of the reference targets Cj each reference target is allotted an acoustic signal emitter and/or receiver and the following process is observed:

a brief and unfocused signal is sent at the optimal frequency from a source, either a reference target or a transducer;

the propagation time of this signal is measured between the source of the signal, i.e. the reference target or the transducer and the different receivers, either all the transducers respectively or all the other reference targets;

the mean propagation speed Vij between the source of the signal and the different receivers is computed as the quotient, for a transducer Ti, of its distance Dij from a reference target Cj to the propagation time tij of the signal between this transducer and this target such as it has been measured (i.e. Vij=Dij/tij); and the above stages (a) to (c) are repeated for all the other sources.

According to an alternative, after receiving the first echo signals the first object to be processed by temporal reversal is chosen by analyzing the wave shapes according to the different return echos received by each transducer, followed by a comparison of these wave shapes against a library of characteristic signatures of the main objects to be detected.

According to yet another alternative, the first object is identified after carrying out k temporal reversals by analyzing the wave shapes according to the different echo signals received by each transducer and comparing these wave shapes against a library of characteristic signatures of the main objects to be detected.

According to a further alternative, after locating and selecting a first object, at least one other acoustic signal is sent to the latter which is in the shape of the one memorized at the end of the last temporal reversal, a signal which is amplified and whose intensity is sufficient to make the object move or vibrate.

A further subject of the invention is a process to determine the propagation characteristics of an acoustic wave in the ground in an area of land, a process characterized in that a multiplicity of transducers is implemented and in that the following stages are carried out:

n transducers are arranged along a first border of the area and m reference targets (m being more than 2) are distributed along a second border of the area;

an optimal operational frequency for the transducers is determined which depends on the type of ground, a frequency which gives a received signal whose amplitude is at its maximum for a majority of transducers when it is emitted by one of them;

a brief unfocused pulse is sent into the ground of the area by at least one transducer at the optimal frequency;

the echos signals returned by the ground and received by all the transducers are recorded, each return signal being memorized according to time, with as the start time the instant of sending the initial pulse;

the echo signals coming from each reference target are successively selected by means of a suitable temporal window, and several temporal reversals are carried out of the signals received by the transducers for each reference target; and a cartography of the propagation characteristics in the ground of the area of land is made by determining a matrix of the mean propagation speeds Vij along the different directions linking each transducer Ti (i varying from 1 to n) to each of the reference targets Cj (j varying from 1 to m), each speed Vij being computed as the quotient, for each transducer Ti, of its distance Dij from the reference target Cj on which the transducers are focused, to the propagation time tij of the signal between this transducer and this target such as it has been measured (i.e. Vij=Dij/tij).

A further subject of the invention is a device to determine the propagation characteristics of an acoustic wave in the ground of an area of land or to detect objects, and in particular mines dispersed in an area of land, a device characterized in that it comprises at least one row of acoustic transducers connected to processing electronics, each transducer being carried by a support designed to be pushed into or applied onto the ground.

This device can comprise at least one row of reference targets which are in the shape of pegs able to be pushed into the ground or else reference targets which have a buried part being roughly of the same shape as the objects which are being searched for in the ground.

The device will advantageously comprise measuring means for the different distances separating the supports, transducers and reference targets.

These means for measuring distance can comprise at least one laser range finder carried by at least one transducer support and/or a reference target.

According to a particular embodiment, the transducer supports and/or the reference targets are individually set into place in the ground, radio link means being provided between each transducer support and/or reference target and at least a part of the processing electronics so as to enable the transducer emissions to be synchronized.

BRIEF DESCRIPTION OF THE DRAWINGS

The invention will be better understood after reading the description of the particular embodiments of the invention, a description made with reference to the appended drawings in which.

DESCRIPTION OF PREFERRED EMBODIMENTS

Figure 1:
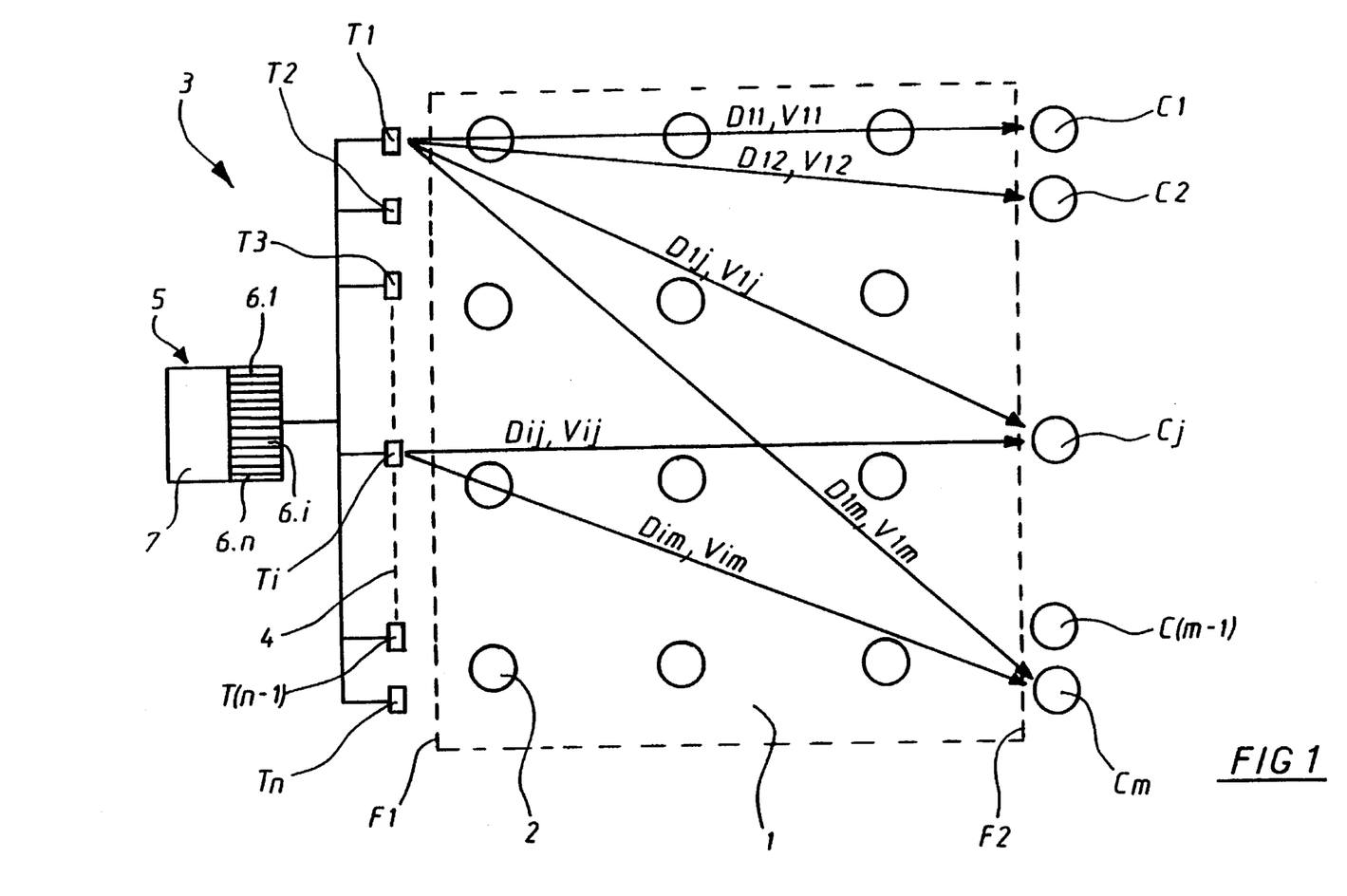
FIG. 1 shows in diagram form an area in the vicinity of which a device according to the invention has been placed, this Figure shows the stage whereby the cartography of the characteristics of propagation of an acoustic wave in the ground of the area is obtained.

With reference to FIG. 1, an area of land 1, marked out here by dotted lines, contains a certain number of objects 2, which are buried mines.

A detection device 3 (or device to determine the propagation characteristics of an acoustic wave in the ground) according to the invention comprises a certain number (n) of acoustic transducers distributed along a line 4 (the different transducers are numbered T1, T2, ... Ti, ... Tn). The transducers are placed along a first border F of the area 1.

The transducers are constituted in a conventional manner by plates of piezoelectric ceramic or by electromagnetic transducers.

The transducers are separated by a space of, for example, around 500 mm. Spacing can be chosen where the value is in the region of that of the largest size of the mines or objects to be detected.

But, relatively wide spacing will preferably be adopted (of around 10 m), this in order to carry out a quick search for mines (or a cartography of acoustic wave propagation) over a large area of land (up to 200 m×200 m).

The transducers are arranged so as to be able to emit and receive acoustic waves in the ground. They are carried, for example, on supports in the shape of pegs which enable them to be installed at an optimal depth (for example, at the usual depth at which mines are usually laid, i.e. from 200 to 300 mm), or else at the depth at which the acoustic propagation characteristics are required to be studied.

The transducers could also be carried on supports which are merely placed on the ground. In this event, the support ensures that the transducer remains flat against the ground. The acoustic waves are therefore emitted on the surface but they propagate, nevertheless, through a layer of ground which is around 200 to 300 mm in depth, thereby enabling the detection of mines which are usually buried at such depths.

The transducers T1 to Tn are connected to an electronic processing box 5 which comprises a certain number of bands 6.1, 6.2, ... 6.i, ... 6.n (one band per transducer) and a common control unit 7.

The device according to the invention also comprises m reference targets, numbered in FIG. 1 as C1, C2, ... Cj, ... Cm and distributed in a line along a second border F2 of the area. The reference targets are, for example, is the form of pegs pushed into the ground to a suitable depth. A depth can thus be chosen roughly equal to that at which the pegs carrying the transducers are buried, or alternatively equal to the depth at which the objects which must be searched for or at which the characteristics of the ground must be measured.

Following the process proposed by the invention the optimal operational frequency of the transducers will firstly be determined.

This frequency depends on the type of ground into which the latter are placed.

In order to determine this frequency a variable unfocused frequency (for example, by means of a wobbling frequency generator) will be applied to a single transducer, preferably the one situated in the middle of the line 4, and the signals received by the other transducers will be analyzed according to the frequency emitted.

A working frequency will be retained for which the amplitude of the signals received by the transducers is at its maximum for the majority of the transducers (at least 50% of them).

In concrete terms, operational frequencies mostly vary between 10 Hz and 100 kHz according to the type of ground.

A cartography of the propagation characteristics of the acoustic waves in the ground of the area of land will then be made.

In order to do this, it is necessary to determine a matrix of the mean propagation speeds $V_{ij}$ along the different directions which link each transducer $T_i$ (i varying from 1 to n) to each of the reference targets $C_j$ (j varying from 1 to m).

According to the advantageous process proposed by the invention, this cartography is made by implementing the method of focusing the sound waves by temporal reversal of the signals.

This method is known to the expert in the field of medical imagery and it is notably disclosed in patents FR2642640 and FR2696573, it will therefore not be described here in detail.

The method comprises:

sending an initial brief unfocused acoustic pulse into the ground by at least one transducer at the optimal frequency;

recording the echo signals returned by the area and received by all the transducers, each return signal being memorized according to time, and with the start time taken as the instant of sending the initial pulse; and successively selecting, by means of suitable temporal windows, the echo signals coming from the different reference targets and carrying out several temporal reversals of the signals received by the transducers for each reference target so as to focus detection on this target.

Each mean propagation speed $V_{ij}$ will therefore be computed as the quotient, for a transducer $T_i$, of its distance $D_{ij}$ from the reference target $C_j$ on which the transducers are focused, to the propagation time $t_{ij}$ of the signal between this transducer and this target such as it has been measured at the end of the last temporal reversal for the target in question (i.e. $V_{ij}=D_{ij}/t_{ij}$).

In practical terms, at least 5 temporal reversals will be carried out for each reference target so as to ensure sufficient focusing.

The number of temporal reversals (even or odd) depends on the type of ground, an odd number of temporal reversals may be preferred so as to have a symmetrical wave front from the signals obtained.

It is considered that the focusing obtained is sufficient when the echo returned from a target stands out clearly from the others, for example, when its amplitude is at least three times greater than that of the others.

The distances $D_{ij}$ are measured with appropriate means, for example a laser range finder mounted on each transducer support and oriented successively towards each reference target.

Each propagation time $t_{ij}$ is measured as being equal to half the duration separating the emission of a signal and the return of an echo which corresponds to the target.

At the end of the cartography operation a matrix has been obtained, characteristic of the area of land 1, and wherein the coefficients are the propagation speeds $V_{ij}$ of the sound waves at the optimal frequency considered between each transducer Ti and each target Cj. These speeds are thus linked to the directions $D_{ij}$ joining a transducer Ti to a target Cj. Only a few propagation directions $D_{ij}$ are shown in FIG. 1.

Focusing the acoustic waves is carried out on each reference target by the choice of a suitable temporal window.

The principle behind the choice of a temporal window is known by the aforementioned documents. It consists in only re-emitting during the temporal reversal those signals coming from a certain area of the land in which there may possibly be an object.

With the process according to the invention the position of the reference targets is known with precision, it is thus easy to choose the echos coming from a given target and to define the temporal window with respect to these echos.

A peg of characteristic size or made of a particular material can advantageously be chosen to make the target such that the echo coming from the reference target may be easily recognized.

Sizes and materials may, for example, be chosen for the reference targets which are similar to those of the objects to be detected.

For the detection of mines, targets comprising a cylinder of around 200 mm in diameter and 100 mm high will be adopted (usual dimensions of an anti-tank mine), a cylinder which will be buried at the usual depth for mines. Refer notably to FIG. 4c described hereafter.

The iterative process of temporal reversal of the signals ensures the focusing of the signal on a particular object. Parasite signals are thus eliminated and the location accuracy of the transducers is improved. It is thus certain that the signals received do, in fact, come from the reference target under consideration thereby guaranteeing the accuracy of the computation of the speed $V_{ij}$ along direction $D_{ij}$.

Figure 3:
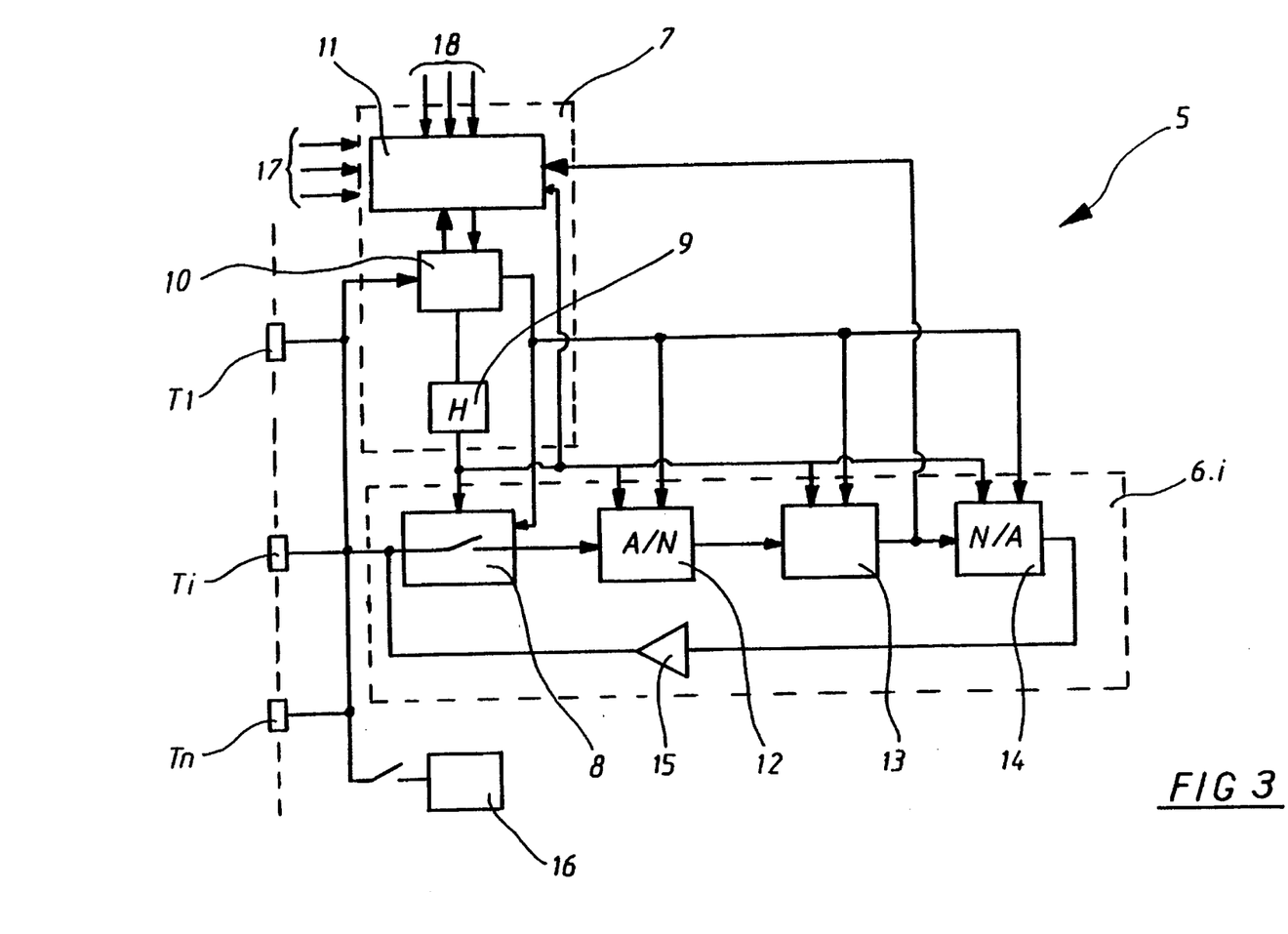
FIG. 3 shows a flow diagram of the processing electronics associated with the device according to the invention.

FIG. 3 shows an embodiment of an electronic processing box 5 enabling the above process to be implemented. These processing electronics comprise processing bands 6.1, ..., 6.i, ... 6.n and a common control unit 7.

Each transducer Ti is associated with a processing band 6.i (only one band is shown here).

Each band 6.i comprises a sampler 8 which is designed to supply analog samples of the signal received by the transducer Ti at the frequency of a clock 9 which is part of the control unit 7. The sampling frequency given by the clock will depend on the optimal working frequency. It will preferably be greater than $R/L \times V_{ij}$, expression in which R is the resolution or the number of points of the signal (100, for example), L is the main dimension of the smallest object searched for and $V_{ij}$ is the mean propagation speed of the waves in the ground.

The periods of time during which the sampler works are determined by a rate setter 10 (also part of the control unit 7). The rate setter allows a temporal window to be defined in which the echo signals will be considered by the different samplers. The duration of the temporal window will be chosen long enough so that each transducer may receive a return echo corresponding to the reference target selected.

In a known manner, this temporal window has been determined after receiving the first echo signals, such as to encompass all the required maximums corresponding to the reference target.

In the event that the distance between the furthest apart transducers (1 and n) is wide (over 100 m), it will be possible to define different temporal windows for several groups of transducers so as to give each window a sufficiently restricted window to eliminate non-desired echos and improve focusing.

The temporal window or windows will be chosen by the user by acting on the rate setter 10 by means of a computer 11 (also part of the control unit 7) which has a suitable interface for the user (keyboard, screen, etc).

For a given band 6.i, the sampler 8 is followed by an analog/digital converter 12. As a general rule, a conversion over ten bits in enough to show the echos in a satisfactory manner. The words which are representative of a sample are stored in a memory bank 15, organized in the form of a stack (of the last in- first out type).

The capacity of this memory bank will be chosen big enough to store all the samples received during the duration of the temporal window.

The rate setter 10 is also provided to cause the emission of a wave front returned after a brief period of time after receiving the received echo (a few milliseconds).

Each band 6.i comprises a digital/analog converter 14 to enable re-emission, followed possibly by an amplifier 15 whose output drives the associated transducer 4.i.

An exciting circuit 16 enables a brief and unfocused initial pulse to be applied to one or several transducers at the optimal frequency.

This exciting circuit can also be used to determine the optimal working frequency.

The circuit 16 is shown connected to all the transducers. In fact, means (not shown) are provided to connect it to one or several transducers at the user's discretion.

Such an electronic processing box 5 is described in patents FR2642640 and FR2696573.

The computer 11 will be connected to all the bands 6.i associated with the different transducers. The same applies to the clock 9 and the rate setter 10, the synchronization of all the different bands being essential to the service quality of the focusing device by temporal reversal of the echos. The connections joining the control unit 7 to the different processing bands 6.i are shown in FIG. 3.

The computer 11 also receives (connections 18) data supplied by the range finder or range finders.

It also contains a memory bank or record allowing the storage of a matrix containing the different relative distances $D_{ij}$ measured between each transducer $T_i$ and each reference target $C_j$.

At the end of each focusing phase by temporal reversal on a given target $C_j$, the computer determines the different propagation times $t_{ij}$ of the signals between each transducer and this target, then it computes the mean propagation speeds $V_{ij}$ along the different directions linking each transducer to the reference target $C_j$ by making the quotient: $V_{ij}=D_{ij}/t_{ij}$.

After carrying out focusing on the different targets $C_j$ (j varying from 1 to m), the computer thus holds in its memory all the values of the mean propagation speeds $V_{ij}$ along the different directions linking each transducer to each reference target.

This matrix of the propagation characteristics is used by the process according to the invention to detect buried objects and in particular mines.

In order to do this, the process of focusing the acoustic waves by temporal reversal will be used again, but this time a temporal window will be chosen enabling the selection of echo signals coming from a first object, such as a mine 2, located within the area.

The working frequency used is once again the optimal frequency as previously defined.

In a conventional manner, the temporal window is chosen from a first echo signal received by the device. As a general rule, the signals surrounding certain maximums picked out on the echos are returned, maximums which in principle correspond to a wave reflected by an object.

Given the size of the land to be explored, the objects nearest to the transducers will be processed first of all, the temporal window will therefore ignore the echos coming from objects further away.

The wave shapes following the different return echos received by each transducer may advantageously be analyzed and compared with a library of characteristic signatures of the principal mines to be searched for.

Such a library is easy to set up by carrying out a calibration of the device on an area of land which is known and in which are buried one after the other the different known mines which may have to be searched for.

The comparison of the wave shapes against the signature library will preferably be made by means of neuronal circuits. Such circuits are known to the expert and they allow the rapid computation of shape recognition.

After choosing the temporal window, k successive temporal reversals are carried out of the signals received by the transducers so as to focus detection on the first mine and the signals reflected at the end of the last temporal reversal are memorized.

After carrying out k temporal reversals, a second identification of the mine can be made with a higher degree of accuracy.

To do this a comparison will once again be made of the wave shapes which follow the different echo signals received by each transducer against a mine signature library.

At the end of the focusing phase, at least two transducers $T_x$, $T_y$ are located for which the propagation times $t_x$, $t_y$ of the signal measured are the lowest.

In principle, these transducers correspond to those located nearest the first mine.

Figure 2:
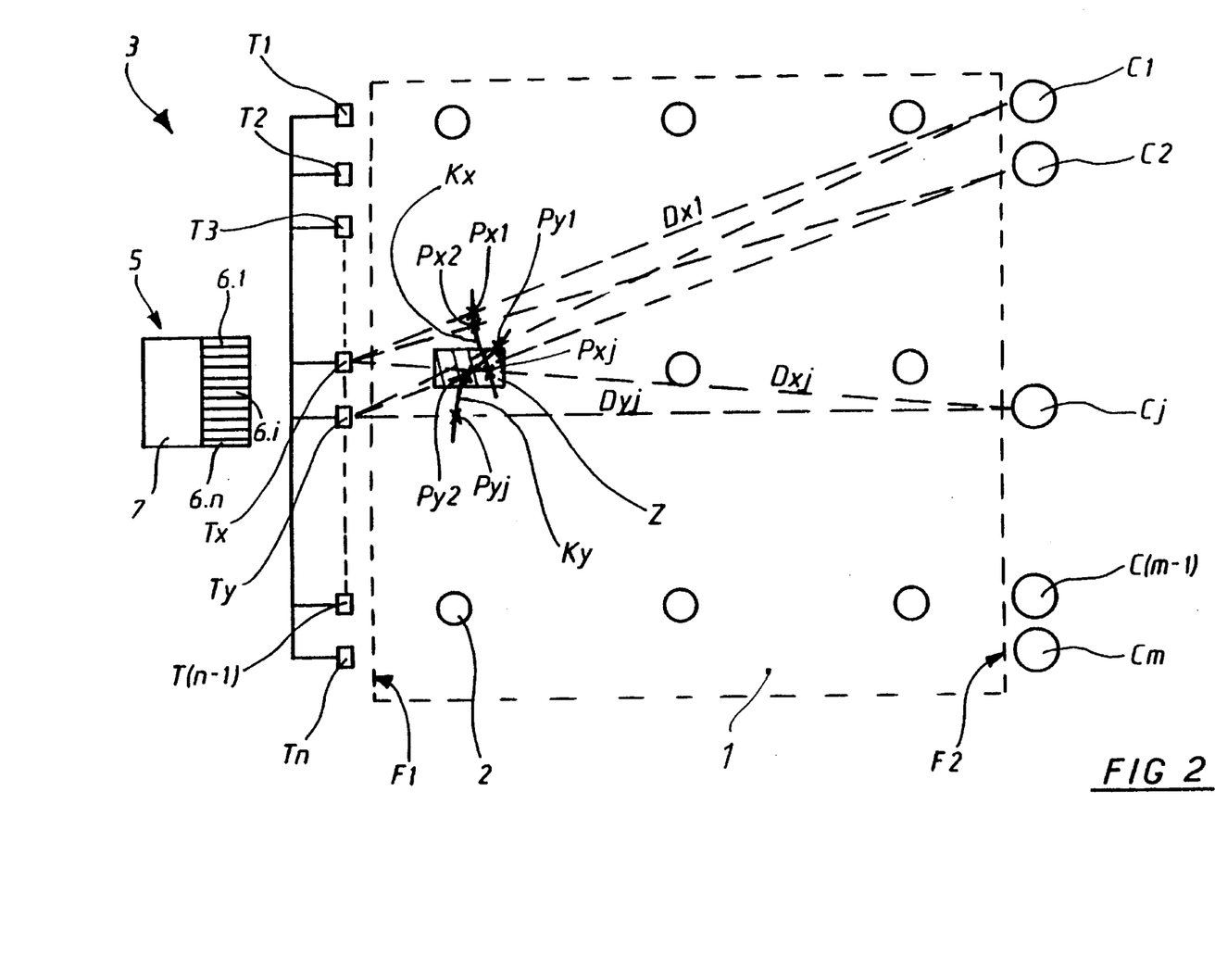
FIG. 2 shows the same area in diagram form during the implementation of a stage to detect buried objects.

FIG. 2 is analogous to FIG. 1 and shows two transducers $T_x$ and $T_y$ which have been retained further to the focusing of detection upon a first mine.

The processing electronics 5 thereafter determine, for each of the transducers ($T_x$ and $T_y$) retained, different potential location points or zones for the mine along the different directions $D_{xj}$, $D_{yj}$ which join each transducer $T_x$, $T_y$ under consideration to each reference target $C_j$.

This determination shall be carried out by computing the different distances $d_{xj}$, $d_{yj}$ (j varying from 1 to m) along directions $D_{xj}$, $D_{yj}$. The distances $d_{xj}$ and $d_{yj}$ are equal to the product of the measured propagation time $t_x$, $t_y$ multiplied by the appropriate coefficient $V_{xj}$, $V_{yj}$ of the matrix of propagation speeds ($d_{xj}=V_{xj} \times t_x$; $d_{yj}=V_{yj} \times t_y$).

This computation enables the determination, associated with each transducer $T_x$ or $T_y$, of a certain number of points, respectively: $P_{x1}$, $P_{x2}$, ... $P_{xj}$, ... $P_{xm}$, and $P_{y1}$, $P_{y2}$, ... $P_{yj}$, ... $P_{ym}$.

The points $P_{xj}$ associated with transducer $T_x$ form a curve $K_x$, those associated with transducer $T_y$ form a curve $K_y$.

The potential location of the first target lies at the intersection of curves $K_x$ and $K_y$, or in a zone for which the distance between the curves is at its maximum.

In practical terms, the computer 11 will ensure the determination of curves $K_x$ and $K_y$, for example by implementing known mathematic methods such as polynomial approximation.

Contiguous transducers $T_x$ and $T_y$ will preferably be chosen. But transducers which are not contiguous can also be used as can more than two transducers. A location zone for the first mine can then be defined as the zone containing the different intersections of the curves K two by two.

In practical terms, a location zone and not a location point will be referred to. In fact, given the degree of error in measuring propagation speeds, a target potentially lies, not at point $P_{xj}$, $P_{yj}$ along a direction $D_{xj}$ or $D_{yj}$, but in a zone (hatched on the figure) which contains the point in question and has a minimum surface area.

Calculating the position of the different points, the mathematical determination of the curves and defining the location zones will be carried out by the computer 11.

A display monitor can facilitate utilization of the data by the user (visualization of the curves and/or location zones with and indication as to their grid reference).

The computer 11 thus compares the signals received the mine library and it will therefore comprise memory banks containing the signature library as well as the requisite neuronal circuits.

After detecting and locating a first mine, the process according to the invention will be reiterated so as to detect and locate another mine. For this, another temporal window will be chosen.

After at least four mines have been pin-pointed, it will be possible to seek to locate the presence of a laying pattern for these first four mines, i.e. a simple mesh which is usually regularly repeated over the ground when the mines are buried.

Determining this laying pattern will help to increase the detection speed for the other mines by allowing the quick definition of the temporal windows which correspond to the areas of land in which a mine may theoretically be found if the mesh is exact.

It is thus possible to define an algorithm to explore the land which will enable an image of the dispersion of the mines over the area of land to be rapidly obtained.

Figure 4A:
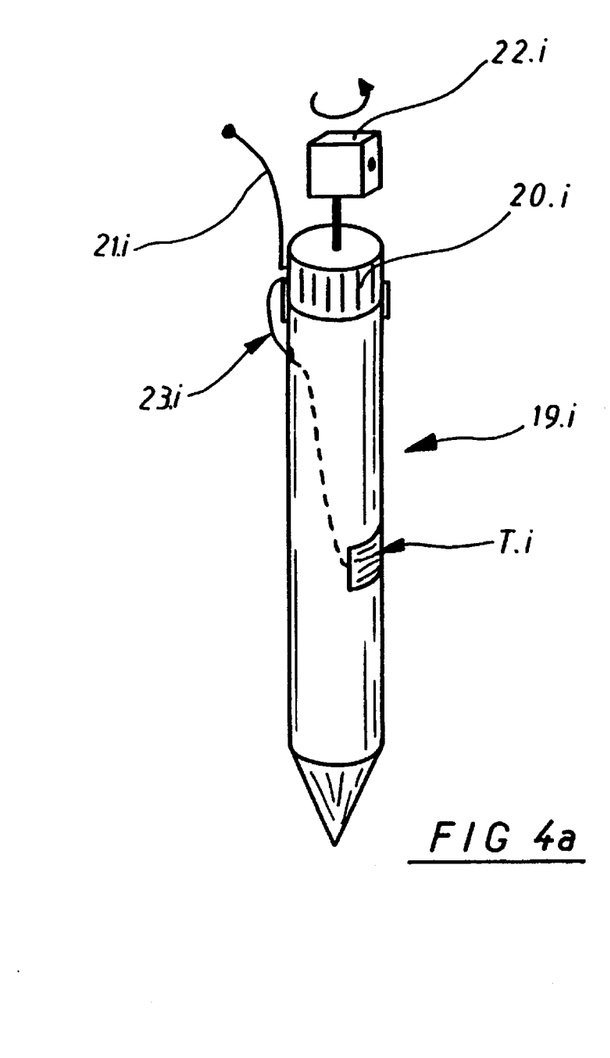
FIG. 4a shows a peg fitted with a transducer.

FIG. 4a shows a peg 19.i which is fitted with a transducer $T_i$ on its lower part and a box 20.i, containing the processing band 6.i associated with the transducers Ti carried by the said peg, on its upper part.

The box 20.i also contains a radio emitter/receiver and is fitted with an antenna 21.i as well as a laser range finder 22.i which can be directed at an angle.

The box 20.i will preferably be able to be dismounted from the peg 19 so as to allow the latter to be pushed into the ground. Electric connection means are provided between the transducer Ti and the box 20.i which will notably comprise a connector 23.i.

Figure 4B:
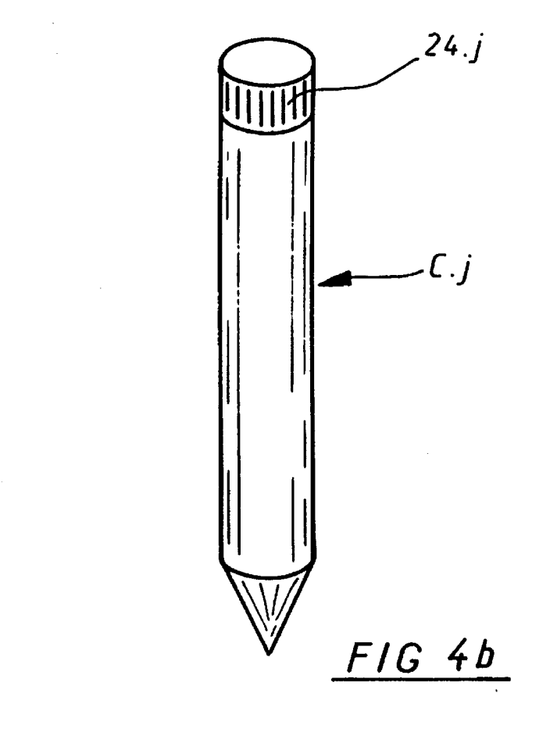
FIG. 4b shows a reference target peg.
Figure 4C:
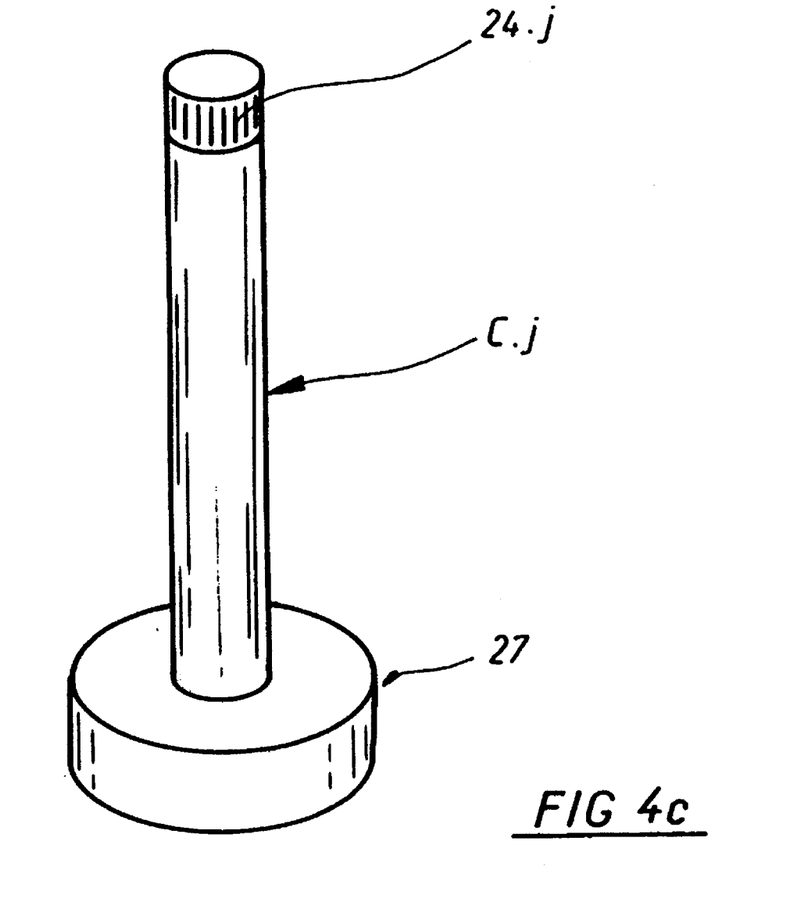
FIG. 4c shows another type of reference target.

FIG. 4b shows a target reference Cj which copies the shape of the peg. On its upper part it is fitted with a reflecting band 24.j which makes it easier to spot by the different laser range finders 22.i.

FIG. 4c shows another type of reference target Cj which comprises a peg having a reflecting band on its upper part 24.j and a cylinder 27 on its lower part of the same size as the actual mine required to be searched for in the area. As mentioned above, the same type of material will be chosen to make the cylinder as that constituting the mines searched for.

When such a reference target is used, a recording can be made of the wave shape which it returns in the area in question. The signature library described above can thereby be expanded allowing the subsequent advantageous search for objects in the same area which return the same type of echo. The cartography and search operations can be reiterated using reference targets of different sizes so as to facilitate the search for other types of objects.

Figure 5:
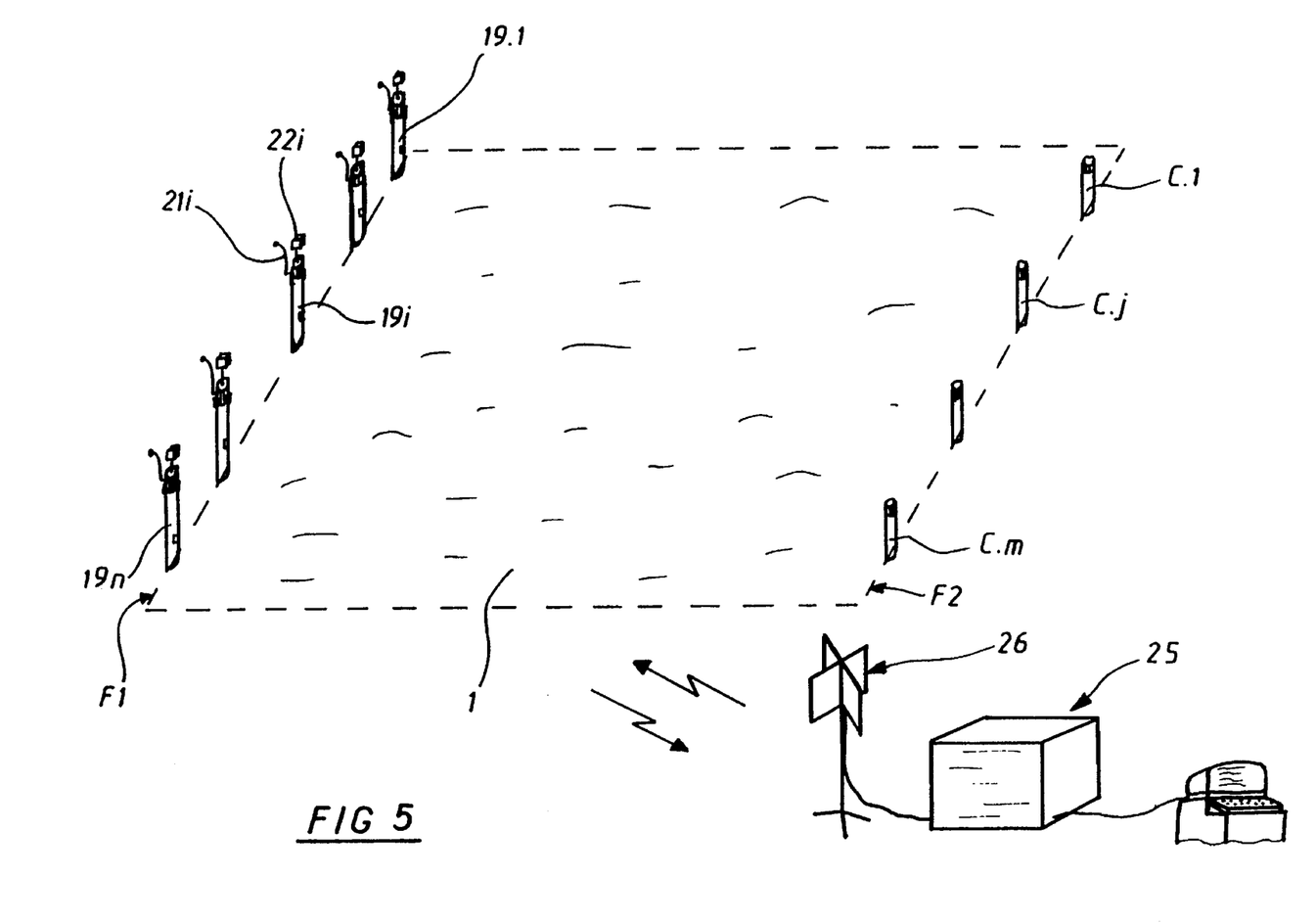
FIG. 5 shows the implementation of the device according to the invention.

FIG. 5 shows the implementation of the device according to the invention.

The pegs 19.i fitted with the transducers Ti are individually set into place along a first border F1 of the area of land 1.

The reference targets Cj are pushed into the ground along the second border F2.

The distance separating the different pegs and the different targets are accurately measured when they are set into place, for example, using laser range finders.

The pegs fitted with transducers will all be pushed into the ground to the same depth.

A command module 25 is placed at a distance from the area of land 1. It also contains a radio emitter/receiver coupled with an antenna 26, it is connected to a display monitor and to a control keyboard.

The command module contains part of the processing electronics. It ensures the functioning of the common control unit 7 described above with reference to FIG. 3. Thus it contains a clock 9, a rate setter 10 and a computer 11. The use of a common clock and rate setter as yell as a radio link makes sure that the emissions from the different transducers are synchronized, even for a large number of the latter and over long distances.

A decoder enables the radio data sent by the different pegs to be converted into data able to be utilized by the computer.

As an alternative, it is possible to position the laser range finders on the target pegs Cj rather than on the pegs fitted with the transducers. The pegs 19.i will, in this event, have a reflecting band to make them easier to spot and the target pegs Cj will be fitted with radio emitters/receivers to ensure a link with the control module 25.

According to another embodiment of the invention, it is possible to implement the detection process described with reference to FIG. 2 by using a cartography of propagation speeds obtained by a process different from that described with reference to FIG. 1.

Each reference target Cj can be fitted, for example, with a receiver to receive the acoustic signals emitted by the transducers Ti.

The following process will be followed, in this case:

a brief and unfocused signal is sent from a transducer Ti at the optimal frequency;

a recording will be made of the propagation times of this signal between the source constituted by the transducer Ti and the different referent targets; and the mean propagation speed $V_{ij}$ between the transducer Ti and the different receivers will be computed as the quotient for a transducer Ti, of its distance $D_{ij}$ from a reference target Cj to the propagation time $t_{ij}$ of the signal between this transducer and this target such as it is measured (i.e. $V_{ij} = D_{ij}/t_{ij}$).

These different stages will be carried out for all the transducers Ti (i varying from 1 to n).

In an analogous manner, each reference Cj target can be fitted with an emitter of acoustic signals and the different transducers Ti can be used as receivers.

In any event, radio link means will be provided between the transducers and/or the targets and the control module 25. The different computations will be ensured by the computer 11 which is part of the latter.

As an alternative, it is possible after detection of a mine to cause its initiation or else to cause it to move, which can make it easier to spot further to the resulting modification to the lie of the land.

In order to do this, a great acoustic energy will be focused on the mine using the last memorized echo signals. A last, temporally reversed signal, will be sent to it but whose amplitude will have been substantially increased by means of an appropriate power generator (for example, in a ratio of 1,000 to 100,000 according the the type, hard or soft, of the ground).

The invention has been described within the scope of its application to the detection of land mines. It is naturally applicable to the detection of buried objects or to the pin-pointing of heterogeneities in the ground.

We claim:

1. A process to detect objects, dispersed in an area of land (1), characterized in that a multiplicity of acoustic transducers (T1, . . . Ti, . . . Tn) are implemented and in that the following stages are carried out:

n transducers are arranged along a first border (F1) of the area, m reference targets (C1, . . . Cj, . . . Cm) (m being more than 2) being distributed along a second border (F2) of the area, an optimal operational frequency is determined for the transducers in accordance with the type of ground, a frequency which gives a received signal amplitude which is at its maximum for the majority of the transducers when emitted by one of them, a cartography of the propagation characteristics in the ground of the area of land is made by determining a mean propagation speed $V_{ij}$ matrix along the different directions which connect each transducer Ti (i varying from 1 to n) to each of the reference targets Cj (j varying from 1 to m), an initial pulse at the optimal frequency is sent into the ground by at least one transducer, by means of at least one temporal window, the echo signals coming from a first object located in the area are selected, k successive temporal reversals of the signals received by the transducers are made so as to focus detection of the first object and the signals reflected after the last temporal reversal are memorized, two transducers Tx, Ty at least are located for which the propagation times of the signal tx, ty are the lowest, the potential location points or zones for objects are determined for the transducers retained along several directions Dxj, Dyj which link the transducer Tx, Ty in question to a reference target Cj, the determination is made by computing the different distances dxj, dyj, (j varying from 1 to m) along directions Dxj, Dyj, the distance being equal to the product of the propagation time in question tx, ty by the appropriate coefficient Vxj, Vyj of the propagation speed matrix, the actual location of the object is determined as the intersection zone of the different curves (Kx, Ky) linking the potential location points associated with each transducer.

2. A detection process according to claim 1, characterized in that to determine the mean propagation speed Vij matrix along the different directions which link each transducer Ti to each of the reference targets Cj, the following process is observed:

a brief and unfocused initial pulse is sent into the ground by at least one transducer at the optimal frequency, the echo signals sent back by the ground and received by all the transducers are recorded, each return signal being memorized according to time, with the start time being the instant of sending the initial pulse, by means of appropriate temporal windows, the echos signals coming from each reference target and successively selected and for each reference target several temporal reversals are carried out for the signals received by the transducers, the mean propagation speeds Vij are computed as the quotient, for each transducer Ti, of its distance Dij from the reference target Cj on which the transducers are focused to the propagation time tij of the signal between this transducers and this target as it has been measured (i.e. Vij=Dij/tij).

3. A detection process according to claim 1, characterized in that to determine the mean propagation speed Vij matrix along the different directions which link each transducer Ti to each of the reference targets Cj each reference target is alloted an acoustic signal emitter and/or receiver and the following process is observed:

(a) a brief and unfocused signal is sent at the optimal frequency from a source, either a reference target or a transducer, (b) the propagation time of this signal is measured between the source of the signal, i.e. the reference target or the transducer and the different receivers, either all the transducers respectively or all the other reference targets, (c) the mean propagation speeds Vij between the source of the signal and the different receivers is computed as the quotient, for a transducer Ti, of its distance Dij from a reference target Cj to the propagation time tij of the signal between this transducer and this target such as it has been measured (i.e. Vij=Dij/tij), (d) the above stages (a) to (c) are repeated for all the other sources.

4. A detection process according to claim 1, characterized in that after receiving the first echo signals the first object (2) to be processed by temporal reversal is chosen by analyzing the wave shapes according to the different return echos received by each transducer, followed by a comparison of these wave shapes against a library of characteristic signatures of the main objects to be detected.

5. A detection process according to one of claim 1, characterized in that the first object (2) is identified after carrying out k temporal reversals by analysing the wave shapes according to the different echo signals received by each transducer and comparing these wave shapes against a library of characteristic signatures of the main objects to be detected.

6. A detection process according to claim 1, characterized in that after locating and selecting a first object, at least one other acoustic signal is sent to the latter which is in the shape of the one memorized at the end of the last temporal reversal, a signal which is amplified and whose intensity is sufficient to make the object move or vibrate.

7. A process to determine the propagation characteristics of an acoustic wave in the ground in an area of land, characterized in that a multiplicity of transducers (T1, ... Ti, ... Tn) is implemented and in that the following stages are carried out:

n transducers are arranged along a first border (F1) of the area and m reference targets (C1, ... Cj, ... Cm) (m being more than 2) are distributed along a second border (F2) of the area, an optimal operational frequency for the transducers is determined which depends on the type of ground, a frequency which gives a received signal whose amplitude is at its maximum for a majority of transducers when it is emitted by one of them, a brief unfocused pulse is sent into the ground of the area by at least one transducer at the optimal frequency, the echos signals returned by the ground and received by all the transducers are recorded, each return signal being memorized according to time, with as the start time the instant of sending the initial pulse, the echo signals coming from each reference target are successively selected by means of a suitable temporal window, and several temporal reversals are carried out of the signals received by the transducers for each reference target, a cartography of the propagation characteristics in the ground of the area of land is made by determining a matrix of the mean propagation speeds Vij along the different directions linking each transducer Ti (i varying from 1 to n) to each of the reference targets Cj (j varying from 1 to m), each speed Vij being computed as the quotient, for each transducer Ti, of its distance Dij from the reference target Cj on which the transducers are focused, to the propagation time tij of the signal between this transducer and this target such as it has been measured (i.e. Vij=Dij/tij).

8. A device (3) to determine the propagation characteristics of an acoustic wave in the ground of an area of land (1) or to detect objects (2), dispersed in an area of land and implementing a process according to claim 1, a device characterized in that it comprises at least one row of acoustic transducers (T1, ... Ti, ... Tn) connected to processing electronics (5), each transducer being carried by a support (19.i) designed to be pushed into or applied onto the ground.

9. A device according to claim 8, characterized in that it comprises at least one row of reference targets (C1, ... Cj, ... Cm) which are in the shape of peg able to be pushed into the ground.

10. A device according to claim 8, characterized in that it comprises at least one row of reference targets (C1, . . . Cj, . . . Cm) which comprise a buried part (27) being roughly of the same shape as the objects which are being searched for in the ground.

11. A device according to claim 8, characterized in that it comprises measuring means (22, 24) for the different distances separating the transducer supports (19.i) and the reference targets Cj.

12. A device according to claim 11, characterized in that the means for measuring distance can comprise at least a laser range finder (22.i) carried by at least one transducer support and/or a reference target.

13. A device according to claim 8, characterized in that the transducer supports and/or the reference targets are individually set into place in the ground, radio link means (21.i) being provided between each transducer support and/or reference target and at least a part of the processing electronics (5) so as to enable the transducer emissions to be synchronized.

* * * * *